United States Patent
Diangelo et al.

(12)
(10) Patent No.: US 6,382,040 B1
(45) Date of Patent: May 7, 2002

(54) METHOD AND APPARATUS FOR DETERMINING THE POSITION OF A SHIFT RAIL

(75) Inventors: Mark Diangelo, Waterford; Edmond R. League, Farmington Hills, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/580,055

(22) Filed: May 27, 2000

(51) Int. Cl.$^7$ ................................................ F16H 59/00
(52) U.S. Cl. ............................................................ 74/335
(58) Field of Search ........................ 74/335; 200/61.91; 340/456; 116/28.1

(56) References Cited

U.S. PATENT DOCUMENTS

| | | | | |
|---|---|---|---|---|
| 4,277,983 A | * | 7/1981 | Iaumi et al. | 74/477 |
| 4,766,774 A | * | 8/1988 | Tamai | 74/335 |
| 5,566,579 A | * | 10/1996 | Willford et al. | 74/335 |
| 5,832,777 A | * | 11/1998 | Weilant | 74/335 |
| 5,845,538 A | * | 12/1998 | Tornatore | 74/473.36 |
| 5,867,092 A | * | 2/1999 | Vogt | 340/456 |
| 5,926,088 A | * | 7/1999 | Barr | 340/457 |
| 6,105,448 A | * | 8/2000 | Borschert et al. | 74/335 |

* cited by examiner

Primary Examiner—Dirk Wright
(74) Attorney, Agent, or Firm—Frank G. McKenzie

(57) ABSTRACT

A method and an assembly 40 for determining the axial and rotational position of a shift member 14. The assembly includes a pair of substantially identical and signal producing sensors 42, 44 which are respectively coupled to first and second members 50, 52. The member 14 is made to include projections 60, 62 which respectively engage members 50, 52 when the member 14 is respectively moved in an axial and rotational manner. In this manner, sensors 42, 44 produce signals which respectively indicate the amount by which the shift rail member 14 has been moved in an axial and a rotational manner and these signals are used to compute the current axial and rotational position of the shift rail member 14.

19 Claims, 2 Drawing Sheets

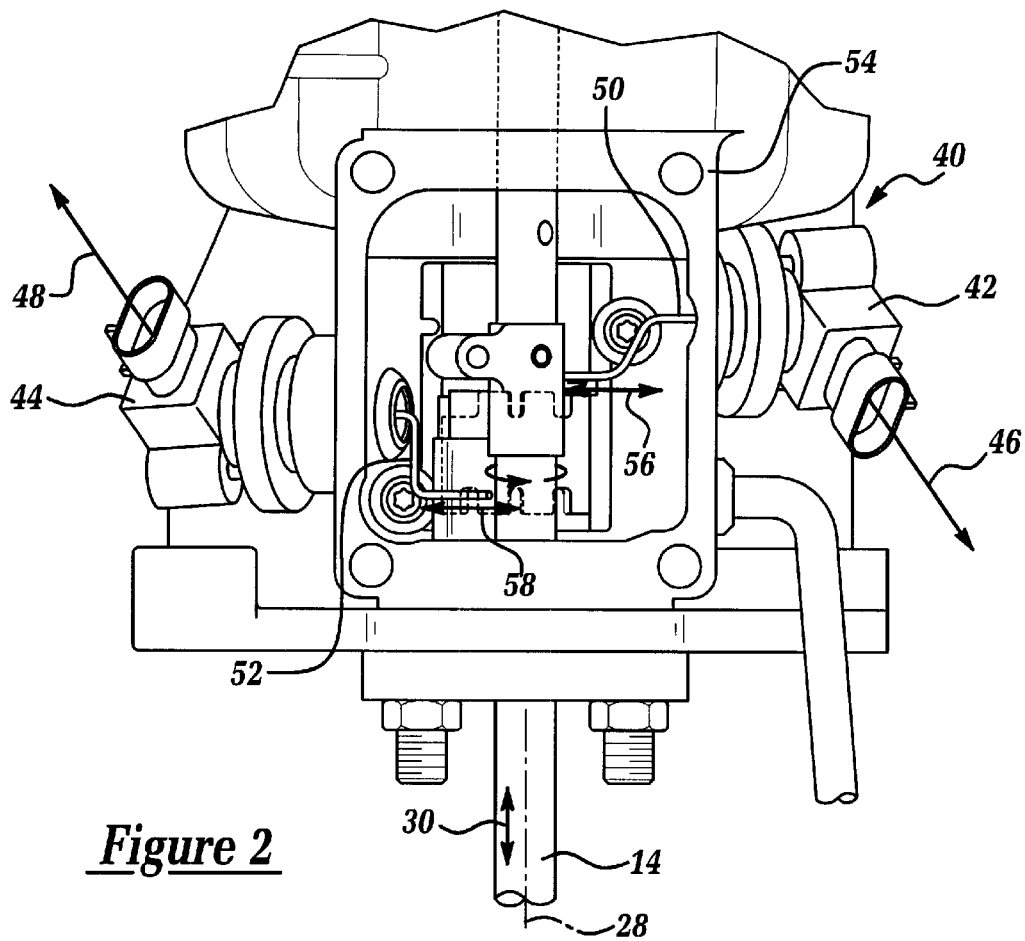

METHOD AND APPARATUS FOR DETERMINING THE POSITION OF A SHIFT RAIL

FIELD OF THE INVENTION

The present invention generally relates to a vehicle transmission and more particularly, to a method and an apparatus for determining the position of the shift rail portion of the vehicle transmission.

BACKGROUND OF THE INVENTION

Transmissions are adapted to transfer or couple torque (i.e., energy) from one portion of a vehicle to another. Particularly, each of these transmissions include several selectively engagable gears which cooperatively provide a variety of selectable gear configurations or coupling arrangements which respectively couple or transfer the received torque in a unique manner (i.e., the conventionally referred to "first gear" arrangement couples or transfers the torque differently than does the conventionally referred to "third gear" arrangement).

While a relatively wide variety of transmissions exist, each of these transmissions are typically of one of two general types which are respectively and often referred to as an "automatic" and a "manual" transmission arrangement. In the former arrangement, the gears are "automatically" configured in the desired manner upon the single movement of a shift device. In the latter arrangement, the gear configuration must be "manually" achieved by the movement of a shift rail member in a desired and relatively complicated manner. While a manual transmission increases the complexity of driving a vehicle, it does provides a better torque transfer efficiency than an automatic type of vehicle transmission.

Attempts have been made to simplify the required shifting of a manual transmission by the use of a selectively depressible switch which communicates with a controller. Particularly, the switch is adapted to selectively occupy several positions and to communicate a unique command signal to the controller upon occupying each of the respective positions. In operation, each switch position and the associated position command signal uniquely corresponds to a certain gear arrangement. In response to a command from the switch, the controller moves the shift rail member to cause the gear configuration which is specified or "commanded" by the currently received signal to be achieved, thereby allowing for an efficient torque transfer while concomitantly simplifying the overall shifting process.

While these previously delineated attempts did provide the foregoing benefits, they suffered from some drawbacks. For example, these controllers did not have knowledge of the position of the shift rail (i.e., the gear arrangement of the transmission) prior to receipt of a position command signal. Rather, these controllers were adapted to receive the signal and to provide the desired gear configuration. Since certain gear configurations may not properly follow other configurations without increasing the likelihood of damaging the transmission, such a poverty of knowledge increased the likelihood of such undesired gear movement, thereby increasing the likelihood of damaging the transmission. Further, these controllers were not adapted to ensure that the shift rail was actually moved in the manner required by the received command signal, thereby preventing potential faults within the transmission assembly from being identified and further increasing the overall likelihood of transmission damage.

There is therefore a need for a method and an apparatus to detect the position of a shift rail in a manner which allows at least some of the foregoing drawbacks and disadvantages to be overcome.

SUMMARY OF THE INVENTION

It is a first object of the present invention to provide a method and an apparatus for detecting the position of a shift rail in a manner which overcomes at least some of the foregoing drawbacks and disadvantages.

It is a second object of the present invention to provide a method and an apparatus for detecting the position of a shift rail in a manner which allows for the efficient transfer of torque while concomitantly allowing for a relatively uncomplicated and efficient method for selecting a desired gear arrangement.

It is third object of the present invention to provide a vehicle transmission which allows gears to be relatively easily interconnected and which further allows the interconnection state of the gears to be identified and communicated in a manner which overcomes at least some of the previously delineated drawbacks and disadvantages to be overcome.

According to a first aspect of the present invention an assembly is provided which detects the rotation and the axial movement of a shift rail.

According to a second aspect of the present invention an apparatus for use in combination with a first selectively movable member is provided. The apparatus comprises a second member which is contacted by the first member when the first member moves in a first direction; a third member which is contacted by the first member when the first member moves in a second direction; and a signal generation assembly which senses the movement of the second and third members and which generates a first signal upon the movement of the second member and a second signal upon the movement of the third member.

According to a third aspect of the present invention a method is provided. The method includes the steps of providing gears; selectively engaging the provided gears in a desired manner; and generating a signal upon the selective engagement of the gears.

These and other features, aspects, and advantages of the present invention will become apparent from a reading of the following detailed description of the preferred embodiment of the invention and by reference to the following drawings.

BRIEF DESCRIPTION OF THE DRAWINGS

FIG. 2 is a top and fragmented view of a portion of the vehicle which is shown in FIG. 1; and FIG. 3 is a front view of the portion of the vehicle which is shown in FIG. 2.

DETAILED DESCRIPTION OF THE PREFERRED EMBODIMENT OF THE INVENTION

Figure 1:
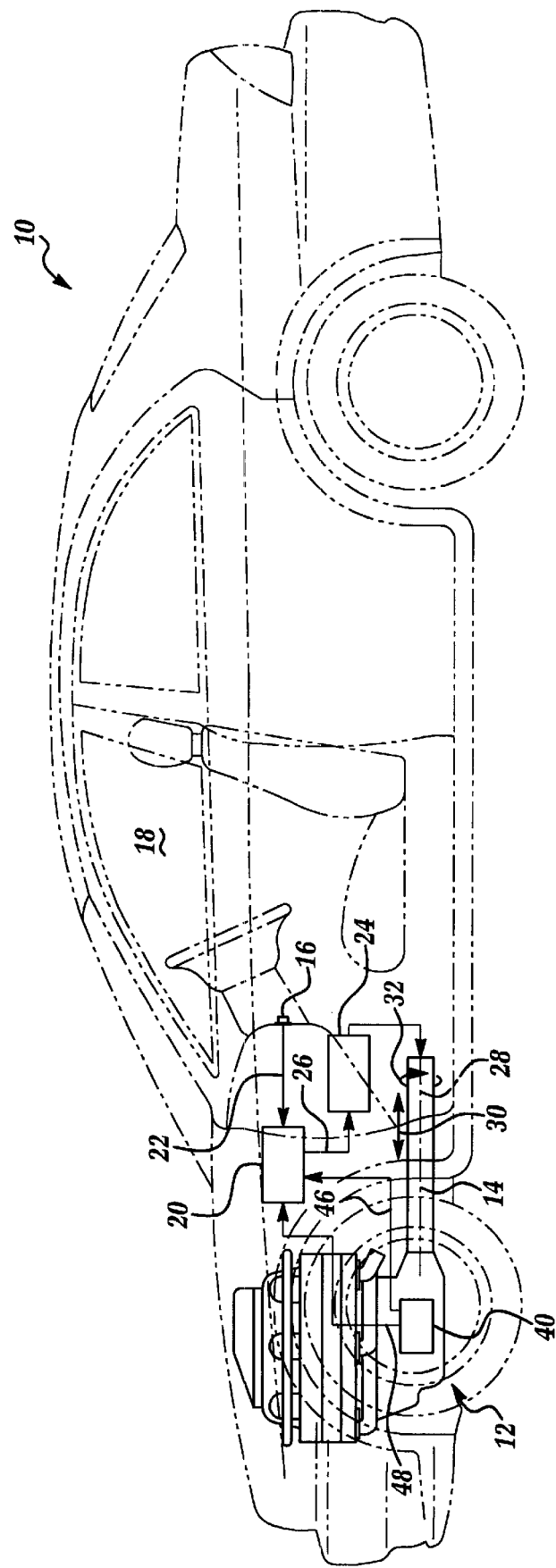
FIG. 1 is a partial side view of a vehicle incorporating an apparatus which is made in accordance with the teachings of the preferred embodiment of the invention.

Referring now to FIGS. 1–3, there is shown a vehicle 10 having a manual type of transmission 12 which is made in accordance with the teachings of the preferred embodiment of the invention and which includes a selectively movable shift rail member 14 which allows several unique gear configurations to be selectively created or achieved.

Further, transmission assembly 12 includes a selectively depressible switch 16 which is operatively positioned within the passenger compartment 18. Transmission assembly 12 further includes a controller 20 which operates under stored program control and which is physically, electrically, and communicatively coupled to the switch 16 by use of bus 22. In the previously delineated manner, switch 16 may be used to generate a plurality of gear configuration commands to the controller 20 by use of bus 22, each of the commands being respectively and uniquely associated with a unique position of the switch 16.

Transmission assembly 12 further includes an actuator 24 which is physically, electrically, and communicatively coupled to the controller 20 by use of bus 26 and which is coupled to the shift rail member 14 and which is effective to move the shift rail member 14 in a desired manner. That is, actuator 24, in one non-limiting embodiment, selectively moves the shift rail member 14 axially (i.e., along the longitudinal axis of symmetry 28 of the shift rail member 14 in the directions shown by "double ended" arrow 30) and selectively rotates the shift rail member 14 in the manner shown by arrow 32. Moreover, actuator 24 may concomitantly rotate and move the shift rail member 14 in an axial manner to achieve the desired position of the shift rail member 14. In this manner, as should be appreciated by those of ordinary kill in the art, shift rail member 14 is selectively moved in a manner to achieve the gear configuration which is specified by the command which emanates from the selectively depressible switch 16 and which is received by the controller 20.

Vehicle 10 and transmission assembly 12 further include a shift rail position detection assembly 40, as shown in FIGS. 1–3, which is made in accordance with the teachings of the preferred embodiment of the invention. Particularly, position detection assembly 40 includes a sensor or signal generation assembly comprising a first sensor 42 and a second sensor 44. In one non-limiting embodiment of the invention, sensors 42, 44 are substantially identical and each comprise a commercially available Hall-effect sensor. Further, each sensor 42, 44 is physically, electrically, and communicatively coupled to the controller 20 by respective busses 46, 48.

Assembly 40 further includes a pair of substantially identical and generally "Z"-shaped members 50, 52 which are respectively coupled to sensors 42, 44 and which movably and/or deformably project into the transmission case 54 along a respective axis 56, 58 which is substantially perpendicular to the axis 28.

In one non-limiting embodiment of the invention, as shown in FIG. 3, sensors 42, 44 outwardly bias respective members 50, 52 against members 60 and 62 in the manner which is more fully delineated below. That is, assembly 40 includes a first projection member 60 which is generally planar and a second projection member 62 having a ridge 64 which is parallel to axis 28 and which contacts the member 52. Member 62 further includes a groove 67 which receives the end portion 66 of member 52 and which substantially ensures that member 52 contacts ridge 64. In one non-limiting embodiment of the invention, projection 60 wholly resides within plane 80, which is perpendicular to the plane 82 within which the ridge 64 is contained.

In operation, as the shift rail member 14 axially moves (i.e., moves along one of the directions of arrow 30) within the transmission case 54, member 60 deformably and movably engages member 50 in a direction which is parallel to the axial direction that the shift rail member 14 is being moved. Moreover, the amount by which the member 50 is deformed (i.e., the amount of force exerted on the member 50 by the member 60) is directly proportional to the amount by which the shift rail member 14 has been axially moved within the transmission case 54. The amount of such deformation is sensed by the sensor 42 which provides a signal, on bus 46, to the controller 20, thereby notifying the controller 20 of the amount of movement of the shift rail member 14.

In one non-limiting embodiment of the invention, controller 20 is provided with the initial axial position of the shift rail member 14. The controller 20 updates or modifies the initially stored (or the then currently stored axial position) in accordance with a recently received signal emanating from sensor 42. In this manner, the controller 20 maintains a listing of the current axial position of the shift rail member 14 and may determine whether the shift rail member 14 has moved in accordance with a previously or recently issued movement command.

Similarly, as the shift rail member 14 rotates (i.e., in one of the directions of arrow 32), member 62 deformably engages the member 52 in one of the two directions. The amount of deformation (i.e., the amount of force applied to the member 52 by the ridge 64) is directly proportional to the amount of rotation of the shift rail member 14. In one non-limiting embodiment of the invention, controller 20 is supplied with an initial rotational position of the shift rail member 14. The controller 20 updates or modifies the initially stored (or the then currently stored position) in accordance with a recently received rotational position signal emanating from sensor 44. In this manner the controller 20 maintains a relatively accurate and "up to date" listing of the current rotational position of the shift rail member 14 and may determine whether a certain rotational command has been followed.

It should be realized that signals from sensors 42 and 44 may concomitantly be generated and that the controller 20 is provided with substantially "real time" axial and rotational position updates, thereby allowing the controller 20 to determine whether a recently received shift command is to be discarded due to the likelihood of causing undesired damage to the transmission due to the current position of the shift rail 14 and the current gear configuration, and to determine whether the transmission assembly 12 is properly functioning. It should also be realized that members 60, 62 may be integrally formed upon the shift rail member 14 or placed upon the member 14 by a variety of known attachment techniques (i.e., laser welding). It should also be realized that the combination of transmission assembly 12 and the position detection system 40 cooperatively comprises a new and useful transmission assembly which overcomes at least some of the previously delineated drawbacks of prior transmission assemblies. Finally, it should be realized that sensors 42, 44 are independently operable (i.e., a signal may be caused to emanate from sensor 42 by an event which is independent from the event which causes a signal to emanate from sensor 44).

It is to be understood that the invention is not limited to the exact assembly or method which has been previously described above, but that various changes and modifications may be made without departing from the spirit and the scope of the inventions as are more fully described in the following claims.

What is claimed is:

1. An assembly which includes a selectively deformable third and fourth projection and which uses said selectively deformable third and forth projections to sense a rotary and an axial movement of a shift rail.

2. The assembly of claim 1 wherein said assembly detects the simultaneous axial movement and rotation of said shift rail.

3. The assembly of claim 2 wherein said assembly comprises:

a first projection which is formed upon said shift rail;

a second projection which is formed upon said shift rail;

a first sensor;

a second sensor;

said deformable third projection which is movably attached to said first sensor; and said deformable fourth projection which is movably attached to said second sensor.

4. The assembly of claim 3 wherein said third and fourth deformable projections are substantially similar.

5. The assembly of claim 4 wherein said first and second sensors respectively and outwardly bias said deformable third and fourth projections.

6. The assembly of claim 3 wherein said first and second sensors each comprise a Hall effect type sensor.

7. The assembly of claim 4 wherein each of said deformable third and fourth projections are substantially z-shaped.

8. An apparatus for use in combination with a selectively movable member having a first and a second portion, said apparatus comprising:

a first z-shaped member which is contacted by said first portion when said selectively movable member moves in a certain first manner and a second z-shaped member which is contacted by said second portion when said selectively movable member moves in a certain second manner; and a signal generation assembly which senses said contact of said z-shaped members and which generates a first signal upon said contact of said first z-shaped member by said first portion and a second signal upon said contact of said second z-shaped member by said second portion.

9. The apparatus of claim 8 wherein said first direction comprises an axial movement.

10. The apparatus of claim 8 wherein said second direction comprises a rotary movement.

11. The apparatus of claim 8 wherein said first and second members are substantially identical.

12. The apparatus of claim 8 wherein said signal generation assembly comprises a pair of Hall-effect sensors.

13. The apparatus of claim 8 wherein said first selectively movable member comprises a shift rail.

14. The apparatus of claim 8 further comprising:

an actuator which is coupled to said first selectively movable member; and a controller which is coupled to said actuator.

15. The apparatus of claim 14 further comprising a selectively depressible switch which is coupled to said controller.

16. A method including the steps of providing gears; providing at least one z-shaped member; selectively engaging the provided gears in a desired manner while concomitantly forcing said at least one z-shaped member to be selectively contacted by said provided gears; and generating a first signal as said gears are being selectively engaged and said at least one z-shaped member is being selectively contacted by said provided gears.

17. The method of claim 16 wherein said gears are engaged by the movement of a shift rail member.

18. The method of claim 17 wherein said step of generating said first signal comprises the step of causing said first signal to be generated upon said movement of said shift rail member.

19. The method of claim 18 wherein said movement comprises a substantially simultaneous rotary and axial movement.

* * * * *